Patented Mar. 25, 1947

2,417,841

UNITED STATES PATENT OFFICE 2,417,841

NUCLEOTIDE COMPOUNDS OF COMPONENTS OF VITAMIN B COMPLEX

Simon L. Ruskin, New York, N. Y., assignor to Frances R. Ruskin

No Drawing. Application June 21, 1944, Serial No. 541,469

11 Claims. (Cl. 167—81)

The present invention relates to new and improved therapeutic agents in the form of nucleotide compounds of the individual or separate components of the vitamin B complex, and more particularly to the adenylic acid compounds of the individual vitamin B components.

I have found that adenylic acid can be combined with the individual components of the vitamin B complex to yield medicinal compositions having novel and valuable properties. Such combinations have a number of advantages. In the first place, the adenylates of the vitamin B components are generally more soluble than either adenylic acid or the vitamin B complex component alone; and the compounds also exhibit an improved stability. Also, from the chemo-therapeutic standpoint my improved compounds are of value because the adenylic acid portion of the compound in general potentiates the vitamin portion, so that a product of enhanced and more efficient action is obtained. In addition, the adenylic acid portion of the compound cooperates with the vitamin to improve the general well being of the patient, since it increases the coronary circulation, aids in carbohydrate and muscle metabolism, and stimulates the reticulo endothelial system.

The compositions of the present invention are suitable for the correction of vitamin B deficiency and especially for the treatment of specific deficiencies falling within the domain of vitamin B treatment. They may be administered in any of the ways now commonly employed for the members of the vitamin B complex, preferably by injection but also perorally, depending usually upon the degree of solubility of all the components of the preparation. The adenylic acid does not act merely as a neutralizer for the individual members of the vitamin complex but itself contributes an important part of the therapeutic action; and the increase of the water-solubility of the adenylic acid by its combination with the individual members of the vitamin B complex constitutes one aspect of the present invention. As I have found, the various elements of the B complex generally fail to accomplish their expected functions where there is a deficiency of adenylic acid, leading in some instances to over-dosage without effective action. Thus riboflavin, which forms part of an enzyme system acting to transfer hydrogen in carbohydrate and amino acid metabolism, requires the presence of the adenylic nucleotide, and without the latter it fails to act properly, or at all; in consequence there may result a deficiency of riboflavin effect despite the presence of adequate amounts of such B complex factor. Riboflavin adenylate, on the other hand, insures effective riboflavin enzyme action.

The enzymes of dihydro nicotinamide (which is produced in vivo), serve as substrates for the riboflavin enzymes. In consequence, nicotinamide adenylate, as I have found, readily potentiates riboflavin. In other words, only one of these two vitamin B complex factors need be in the form of a combination with the isolated adenylic nucleotide, but if desired, both may be. Omission of the administration of at least one of these factors in the form of the adenylate may leave a patient deficient in vitamin B complex action despite a large intake of the customary vitamin B complex capsules or solutions; for the absence of one factor in a series of respiratory or oxidation-reduction enzymes can disturb the action and utility of the whole system. The absence of adenylic acid (by which term is to be understood the individual or isolated compound, substantially free from other nucleotides) can thus be responsible for a failure in action of riboflavin, and this in turn can cause failure of proper action of both thiamine and nicotinamide.

The adenylic acid may be combined with the vitamin material in any suitable manner, but preferably in aqueous solution or suspension, preferably with the aid of heat. The product may be precipitated from the aqueous solution either by evaporation or by the addition of an organic solvent in which the product is insoluble. The compounds may be marketed in the solid form or as aqueous solutions.

The starting materials are preferably mixed in combining or stoichiometric proportions; and where the vitamin B material is in the form of the hydrochloride or other acid salt, sufficient sodium hydroxide is added to raise the pH to a value suitable for injection. Preferably, sufficient sodium hydroxide is added to bring the solution approximately to neutrality; and while the adenylate may be separated from the formed sodium chloride by fractional precipitation or crystallization in any suitable manner, the inorganic salt may, if desired, be allowed to remain with the adenylic compound.

The preparation of the adenylates of the individual members of the B complex automatically limits the amount of adenylic acid to useful and safe dosages, it being important to avoid an over-dosage of adenylic acid itself by reason of its own pronounced physiological action. I have found that the safe and satisfactory dosages of the different adenylates are approximately as follows:

Thiamine adenylate, 1–5 mg., one to three times a day; nicotinamide adenylate, 5–10 mg., one to three times a day; riboflavin adenylate, 2–5 mg., one to three times a day; pyridoxin adenylate, 2–5 mg., one to three times a day.

Choline is now generally regarded as a member of the B complex, and I have found that the adenylate of this compound provides an improved medium for its administration.

The invention will be described in greater detail in the following examples which are presented purely for purposes of illustration:

EXAMPLE 1

Nicotinamide adenylate 0.347 g. (0.001 mole) adenylic acid were suspended in 10 cc. water to which was then added 0.244 g. (0.002 mole) nicotinamide. On heating to the boiling point complete solution took place. The reaction mixture was then concentrated in vacuo to dryness. A white crystalline product of di-nicotinamide adenylate was obtained. Yield quantitative.

As adenylic acid is twice as soluble in water in the presence of nicotinamide as it is in the absence of the latter, it appears that chemical combination has taken place with formation of a salt. This is also true for thiamine and pyridoxin.

EXAMPLE 2

Thiamine adenylate 0.347 g. (0.001 mole) adenylic acid were suspended in 10 cc. water. To this was added 0.337 g. (0.01 mole) thiamine hydrochloride. On heating to the boiling point complete solution took place. A very acid solution was obtained due to the liberation of hydrochloric acid. The pH value was raised by the addition of 1 cc. N NaOH. The reaction mixture was concentrated in vacuo to dryness. A white crystalline precipitate of thiamine adenylate was obtained which also contained one equivalent of sodium chloride.

EXAMPLE 3

Pyridoxin adenylate 0.347 g. (0.001 mole) adenylic acid were suspended in 10 cc. water. To this was added 0.196 g. (0.001 mole) pyridoxin hydrochloride. On heating to the boiling point complete solution took place. The acidity of the solution was reduced with 1 cc. N NaOH (0.001 mole). The reaction mixture was then concentrated in vacuo to dryness. A white crystalline precipitate of pyridoxin adenylate was obtained which was mixed with one equivalent of sodium chloride.

EXAMPLE 4

Riboflavin adenylate 0.347 g. (0.001 mole) adenylic acid were suspended in 10 cc. water to which was added 0.376 g. (0.001 mole) riboflavin. On heating to the boiling point complete solution occurred giving an orange-yellow solution. The reaction mixture was then concentrated in vacuo to dryness. A golden-yellow crystalline product was obtained, the mono nucleotide of riboflavin.

The di-adenylate of riboflavin was obtained by reacting as above 0.001 mole of riboflavin with 0.002 mole of adenylic acid. The increased solubility of the adenylic acid when reacted with the riboflavin showed the formation of a salt. The crystals of riboflavin adenylate are readily water-soluble and can be packaged in ampoules for injection. Although riboflavin is soluble in alkali it is quite unstable in such solution, whereas in the form of the adenylate it is stable indefinitely in solution. The therapeutic activity of riboflavin is markedly enhanced as the adenylate salt.

EXAMPLE 5

Choline adenylate 0.369 g. (0.001 mole) sodium adenylate is dissolved in 10 cc. water to which is added 0.139 g. (0.001 mole) choline chloride. A clear solution results. To this is now added 2 volumes of acetone and the solution is placed in the ice chest over night. The crystalline precipitate is choline adenylate. The crystals are kept in the vacuum desiccator until ready for packing under anhydrous conditions.

The choline adenylate is less soluble than choline chloride but is much more stable in solution. It has a profound effect in causing a lowering of blood pressure, and has a longer action than commonly used vaso-dilators. The dosage is 5–10 mg. by injection.

While the adenylates above described can advantageously be administered singly for the correction of specific deficiencies, they may be combined to build up synthetically a complete or partial B complex preparation. In many instances a satisfactory mixture can be produced if only some, or only one of the factors is in the form of the adenylate.

I claim:
1. Thiamine adenylate.
2. Nicotinamide adenylate.
3. Riboflavin adenylate.
4. Riboflavin di-adenylate.
5. A vitamin B complex preparation containing at least one of the factors of the group consisting of thiamine, riboflavin, nicotinamide, pyridoxin and choline in the form of a synthetically and previously produced adenylate.
6. Process for the manufacture of adenylic acid compounds of individual members of the vitamin B complex which comprises heating an aqueous suspension of adenylic acid substantially devoid of other nucleotides, with a member of the group consisting of thiamine, riboflavin, nicotinamide, pyridoxin and choline.
7. Process for the manufacture of adenylic acid compounds of individual members of the Vitamin B complex which comprises heating an aqueous suspension of adenylic acid substantially devoid of other nucleotides, with a salt of a member of the group consisting of thiamine, riboflavin, nicotinamide, pyridoxin and choline, adding sodium hydroxide to reduce the acidity of the solution, and recovering the adenylate so formed.
8. Process according to claim 6 wherein the adenylic acid and Vitamin B component are present in stoichiometric proportions.
9. The reaction product of isolated adenylic acid and a member of the group consisting of thiamine, riboflavin, nicotinamide, pyridoxin and choline.
10. A substantially neutral composition comprising the reaction product of isolated adenylic acid and a member of the group consisting of thiamine, riboflavin, nicotinamide, pyridoxin and choline.

11. A composition comprising the reaction product of essentially stoichiometric proportions of adenylic acid and a member of the group consisting of thiamine, riboflavin, nicotinamide, pyridoxin and choline.

SIMON L. RUSKIN.

REFERENCES CITED

The following references are of record in the file of this patent:

UNITED STATES PATENTS

| Number | Name | Date |
|---|---|---|
| 2,250,474 | Eisenbrand | July 29, 1941 |

OTHER REFERENCES

Gutman, Modern Drug Encyclopedia, First Edition (1934), page 617.

Gutman, Modern Drug Encyclopedia, Second Edition (1941), page 1036.